April 20, 1948.  A. A. STUART, JR  2,439,877
CATHODE RAY PHASE INDICATOR
Filed Oct. 6, 1943    3 Sheets-Sheet 1

INVENTOR.
Alfred A. Stuart, Jr.
BY
David F. Doody
ATTORNEY

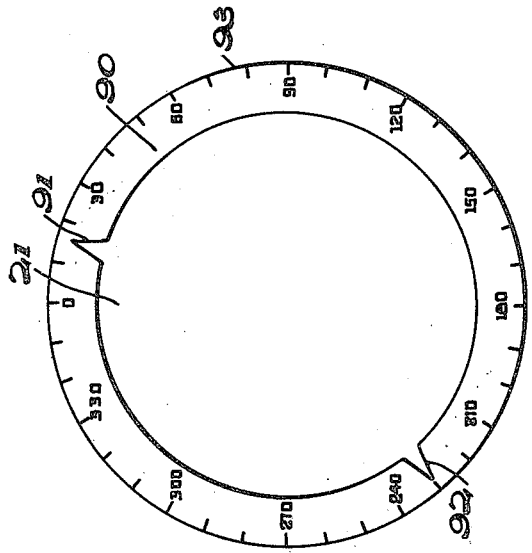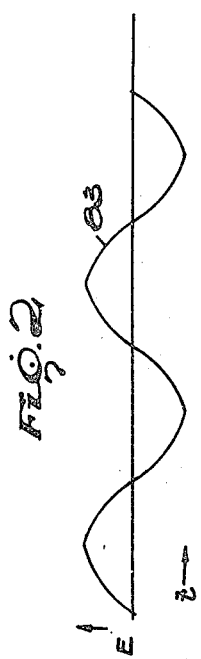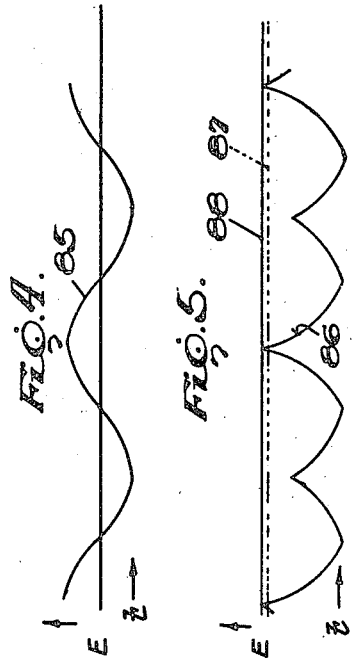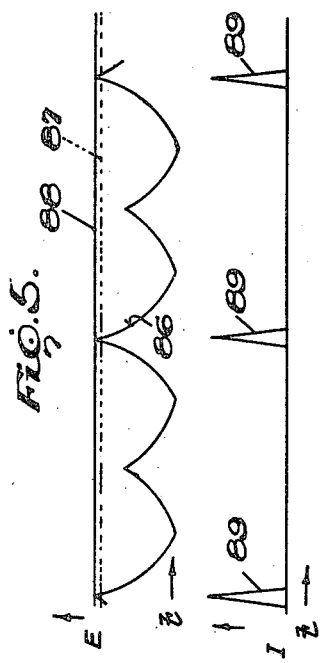

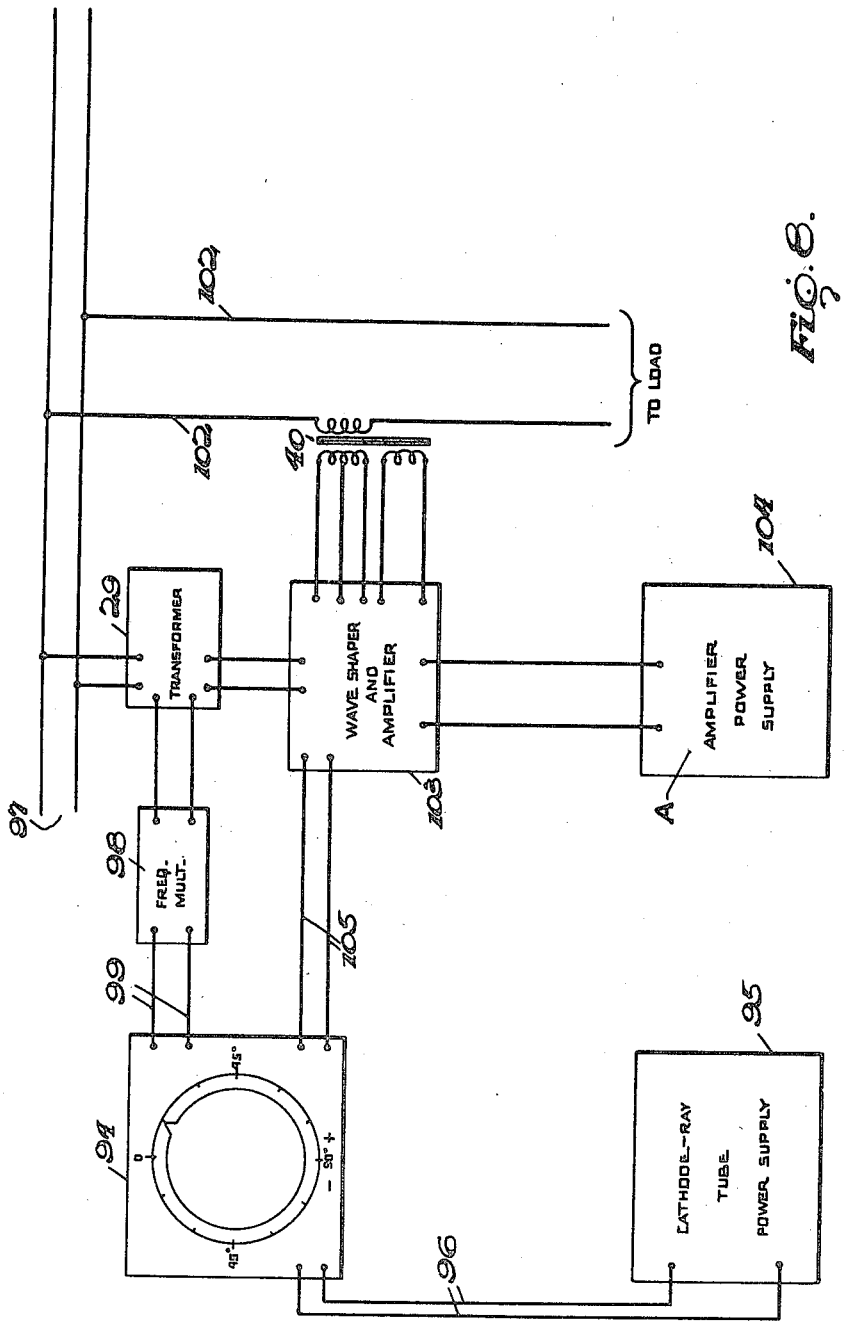

Patented Apr. 20, 1948

2,439,877

UNITED STATES PATENT OFFICE 2,439,877

CATHODE-RAY PHASE INDICATOR

Alfred A. Stuart, Jr., Hasbrouck Heights, N. J., assignor to Bendix Aviation Corporation, New York, N. Y., a corporation of Delaware Application October 6, 1943, Serial No. 505,242

4 Claims. (Cl. 172—245)

1

This invention relates to phase measuring apparatus, and more particularly to rapidly responsive phase measuring apparatus of the cathode ray type providing visual indication over a 360 degree sector.

A number of means are now known whereby the phase relations of two currents or voltages may be determined through the observation of patterns produced on the fluorescent screen of cathode ray tubes by the action of a beam of electrons responsive to the currents or voltages whose relation is being investigated. In general, the patterns produced are more suited for deriving qualitative information than for quantitative data and many can be properly interpreted only after considerable instruction and experience of the operator. However, people active in the electrical industry are familiar with electrical indicating instruments employing a pointer moving over a printed scale and experience no unusual difficulty in making quantitative determinations with this class of apparatus. It therefore appears that phase measuring apparatus having the quick response characteristic of cathode ray apparatus, but retaining the ready readability of the scale and pointer type of indicating instrument, combines the best features of the two species of apparatus and renders available to the inexperienced operator the very useful advantages of cathode ray phase indicating apparatus.

One of the principal objects of this invention is to provide new and novel phase indicating apparatus having negligible time lag, which is easily read by inexperienced operators.

Another object of the invention is to provide new and novel cathode ray phase indicating apparatus substantially duplicating the indicating mode of pointer and scale instruments.

A further object of the invention is to provide cathode ray phase indicating apparatus having means for preventing 180° ambiguity in the indications furnished.

Still another object of the invention is to provide phase indicating apparatus simultaneously indicating the phase relationships of a plurality of currents or voltages to a reference term.

Yet another object of the invention is to provide phase measuring apparatus in which the scale modulus may be made greater than unity.

Other objects and advantages of the invention will in part be described and in part be obvious when the following specification is read in conjunction with the drawings in which:

2

Figure 1 is a schematic diagram of apparatus utilizing the invention.

Figures 2, 3, 4, 5, and 6 are oscillographic diagrams illustrating the potential wave forms at various portions of the circuits.

Figure 7 is a diagram of the face of the indicator 21.

Figure 8 is a block diagram of the invention in a modified form having increased sensitivity of indication.

Figure 1:
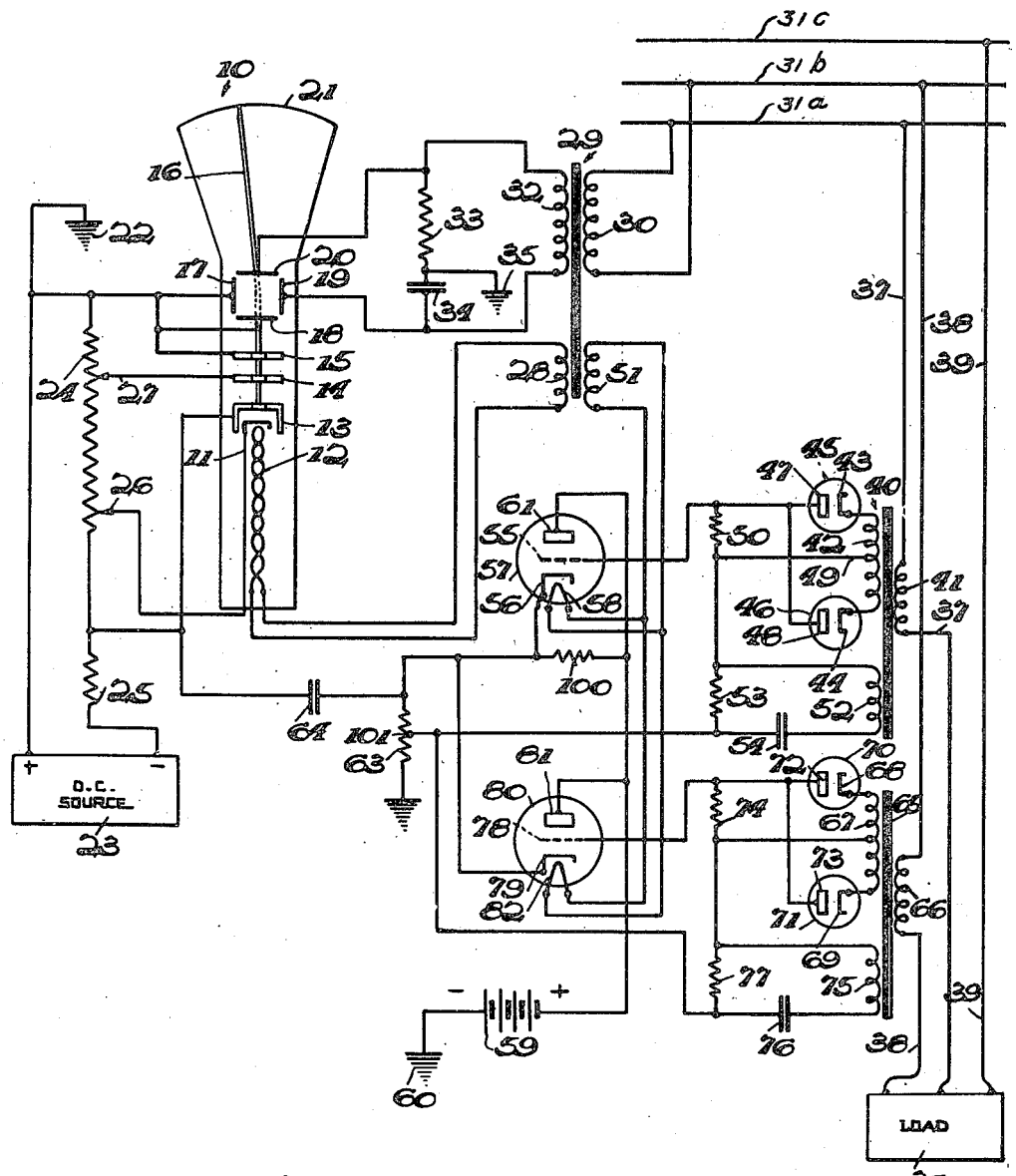

Referring now to Figure 1, there appears the three-phase, three-wire line with phase conductors $31a$, $31b$, and $31c$ which are connected to the load 36 by conductors 37, 38, and 39 respectively. The voltages existing between conductors $31a$—$31b$, $31b$—$31c$, and $31a$—$31c$ may be referred to as phase A, phase B and phase C respectively. The power supplied to the load 36 from the 3-phase line may be determined from a knowledge of the magnitude and phase, with respect to a reference voltage phase, of the current flowing through any two of the wires connecting the load to the lines $31a$, $31b$, and $31c$. In the apparatus to be described, means are provided for the measurement of the phase of the current flowing to the load from the reference conductors $31a$ and $31b$ through conductors 37 and 38 with respect to the voltage in phase A. This apparatus includes a cathode ray tube 10 having the cathode 11 thermally associated with the heater 12. Electron emission from cathode 11 is controlled by the adjacent grid electrode 13, and beyond this are located the focusing electrode 14 and the final accelerating anode 15. The combination of electrodes just described is often referred to as an electron gun assembly and produces a focused beam of electrons of controllable intensity in a manner familiar to those skilled in the art. After leaving the electron gun assembly, the electron beam 16 passes through the deflecting plate assembly including deflecting plates 17, 18, 19, and 20, plates 17 and 19 being adapted to deflect the beam in one plane and plates 18 and 20 being adapted to deflect the beam in a plane normal thereto. The electrons in beam 16 continue their flight until halted by impact against a screen of fluorescent material located on the inside of the face 21 of the tube 10.

Plates 17 and 18 are connected to the ground 22 and the direct current potentials necessary to the operation of tube 10 are obtained from the high voltage source 23 which is connected to the voltage divider 24 through the isolating resistor 25. The grid 13 is connected to the junction between resistor 25 and voltage divider 24, the cathode 11 is connected to the movable tap 26 engaging voltage divider 24 and focusing electrode 14 is connected to the tap 27 on voltage divider 24. The heater 12 is energized from the secondary 28 of transformer 29 having the primary 30 connected to phase A of the 3-phase line. Transformer 29 is also provided with a secondary 32 across which are connected the resistor 33 and capacitor 34 in series, with the junction point between these two impedance elements connected to the ground 35. As is well known, the alternating current potentials across resistor 33 and capacitor 34 are in quadrature phase relationship and by proper selection of the values of the elements themselves can be made equal in amplitude. The deflecting electrode 19 of tube 10 is connected to one terminal of the secondary 32 while the deflecting electrode 20 is connected to the other terminal thereof. The effect of the potentials thereby impressed on the deflecting electrode assembly is to produce a rotating electric field with constant intensity revolving at the frequency of the impressed alternating current. The tube 10 is placed in operation by adjusting the movable taps 26 and 27 respectively to secure a beam of the desired intensity and sharpness of focus at which time a circular fluorescent trace may be observed at the face 21 of the cathode ray tube. The indicating apparatus so far described is well known and forms no part of the invention to be described.

A load 36 is connected to the phase conductors 31a, 31b, and 31c by the conductors 37, 38 and 39 and there is introduced in the conductor 37 the current transformer 40, having the primary 41 and the center tapped secondary 42. The cathodes 43, 44 of the thermionic rectifying devices 45, 46 are connected respectively to the two ends of winding 42 and the anodes 47, 48 thereof are connected together and to the center tap 49 through the resistor 50. A full wave rectified potential therefore appears across resistor 50. Heaters are associated with the cathodes of rectifiers 45 and 46, but have been omitted from the drawing for the sake of simplicity, as such heaters may be energized in any conventional manner.

A secondary winding 52 is also a part of transformer 40 and is connected to the resistor 53 through the capacitor 54. The heater 58 of the tube 57 is energized from the secondary winding 51 of the transformer 29 and anode excitation is supplied from the direct current source 59 having the negative terminal connected to the ground 60 and the positive terminal thereof connected to the anode 61 of tube 57. The direct current anode circuit for the valve 57 is completed by the connection of the resistor 63 between the cathode 56 and ground. Resistors 50 and 53 are connected together at one end, and the opposite ends are respectively connected to the control grid 55 and the tap 101 on the resistor 63. The resistor 100 connected between the positive terminal of source 59 and the cathode 56 provides a certain minimum passage of current through the resistor 63 at all times, which produces a difference in potential between the cathode end of resistor 63 and the tap 101 applied to the grid circuit of the valve 57 as bias. Voltage impulses appearing across the resistor 63 are conveyed to the control grid 13 of the cathode ray 10 by the coupling capacitor 64.

A second similar wave shaping and amplifying stage is also connected to the resistor 63 and is energized by the current passing to the load 36 through the lead 38 and the primary 66 of the current transformer 65 provided with the center tapped secondary 67. The extremities of the winding 67 are connected to the cathodes 68 and 69 of the diode rectifying devices 70 and 71, which are provided with heaters similarly to rectifiers 45 and 46. The anodes 72 and 73 of diode rectifiers 70 and 71 are connected together and to the center tap of winding 67 through the resistor 74. Also located on the transformer 65 is a secondary winding 75 across which there are connected in series the capacitor 76 and resistor 77, resistor 77 being connected in series with resistor 74, and the opposite ends of this series arrangement being additionally connected to the control grid 78 and the tap 101 on resistor 63. Anode 81 of the valve 80 is connected to the positive terminal of source 59 and the cathode 79 thereof is connected to the resistance 63 together with the cathode 56 of the valve 57. An associated heater 82 serves to elevate the cathode 79 to the required operating temperature and is energized from the winding 51 of the transformer 29.

The operation of the apparatus is most easily understood by considering the circuits of Figure 1 in connection with the oscillographic diagrams of the voltages existing across the various elements. The wave shaping and amplifier stages will be considered separately in the interest of simplicity of presentation. The current flowing to the load 36 through the lead 37 produces a substantially sinusoidal voltage wave across the windings of transformer 40 as illustrated by the curve 83 of Figure 2. The rectifying action of the diodes 45 and 46 provides a voltage across the resistor 50, having the wave form of the curve 84, Figure 3, while the phase shifting action of capacitor 54 in the circuit connected to winding 52 provides a voltage across 53 shifted in phase by approximately 90° as shown by the curve 85 of Figure 4. The series connection of resistors 50 and 53 causes these voltages to be impressed simultaneously between the control grid 55 and the cathode 56 of the valve 57 in addition to the bias voltage existing across the tapped section of resistor 63, the resultant voltage being presented by the curve 86 of Figure 5.

The valve 57 together with the valve 80 is, by selection, an electric discharge tube of the type having a sharp cut-off of the anode current with small negative voltages applied to the control grid. The cut-off voltage is represented by the dotted line 87 displaced negatively of the reference axis 88 in Figure 5. The flow of anode current is completely blocked so long as the potential impressed on the control grid is more negative than the value represented by the dotted line 87, in other words, whenever the curve 86 lies below the dotted line 87. It will be noted that the addition of the waves 84 and 85 with the steady state bias results in a composite wave which crosses the cut-off line but once each cycle. At each excursion of the control grid 55 positively of the cut-off line, anode current is permitted to flow through the valve 57 and, since the period of the excursion is quite short, the resultant plate current pulses are extremely narrow. The form of the anode current pulses is indicated by the figures 89 in Figure 6. These anode current pulses produce corresponding positive voltage pulses across the resistor 63 which are impressed on the control grid 13 of the cathode ray tube 10, thereby decreasing the instantaneous accelerating potential and causing increased radial deflection of the beam 16 during the period of the pulse.

The diagram on the screen 21 of the cathode ray tube 10 resulting from this combination of potentials and apparatus is shown in Figure 7. Normally, under the influence of the reference energy of phase A the end of the electron beam 16 traces a circle on the screen 21 of the cathode ray tube, making one complete circuit of the screen per cycle of the reference voltage. This generates the circular portion 90 of the trace. When the current in line 37 passes through one of its zeros, the anode current pulse passed by the valve 57 momentarily decreases the accelerating potential supplied to the electron gun assembly permitting the beam to momentarily deflect radially outward producing the indication shown at 91. By reading the scale 93 around the periphery of the screen 21, the phase angle between the current in line 37 and the voltage of phase A may now be immediately determined.

The current through transformer 65 produces similar pulses at the output of the valve 80 across resistor 63, providing a second indication at 92 indicative of the phase angle of the current through the line 38. It will be at once appreciated that by the incorporation of additional amplifiers, the phase angles of any number of different currents can be determined without mutual interference, unless the difference in phase angles is less than the width of the triangular image produced on the screen. The numerical magnitude of the phase angles may be read directly from the cooperating scale 93 associated with the tube 10. This scale may either be etched on the screen 21 or located on an adjacently mounted bezel.

The apparatus thus far described provides a circular cathode ray trace in which the exciting beam of electrons makes one revolution on the screen per cycle of the line current. Thus, a 1° change in the phase angle of a current under observation is indicated by a 1° displacement of the indicating triangle along the trace. The indicating apparatus may therefore be said to have a scale modulus of unity. When making measurements on a single phase line, it is found that phase variations are confined to a maximum total excursion of 180°, since known impedance elements are capable only of either retarding or advancing the phase of the current by 90°. Accordingly, increased sensitivity of indication may be obtained over the working range by providing a scale modulus of 2 on a 360° scale, in which case a 1° change in the phase of the current under measurement will be reflected in a 2° shift of position of the indicating trace.

The apparatus in Figure 8 sets forth a system altering the scale modulus in the desired fashion. In this figure, many of the elements which are shown in detail in Figure 1 are merely indicated as blocks, since their internal details have already been presented. The indicator apparatus 94 is provided with the necessary operating potentials from the power supply 95 through the leads 96, and the deflecting circuits are energized from the line 97 through the transformer 29 and frequency multiplier 98. In this particular case, where it is desired to secure a scale modulus of 2, the frequency multiplier increases the frequency of the line current by a factor of 2. Any of the many frequency doublers familiar to those skilled in the art may be employed in this position. The doubled frequency is conveyed from the output of multiplier 98 through the leads 99 to the deflecting circuit input of the cathode ray indicating apparatus 94, within which it is impressed on a phase splitting circuit similar to that shown in Figure 1 and then led to the deflecting plates. The scale modulus may be multiplied by any factor desired, the modulus being equal at all times to the multiplication factor provided by the frequency multiplying apparatus.

The load is connected to the line 97 through the leads 102, in one of which there is introduced a current transformer 40, having secondaries connected to the wave-shaper and amplifier 103 constructed in the manner outlined in connection with Figure 1. The unit 103 receives power from the amplifier power supply 104 and the transformer 29 and provides pulses on the leads 105 of the form previously described. It will be noted that this assembly deviates from the presentation of Figure 1 only by the inclusion of the frequency multiplier 98 between the transformer 29 and the cathode ray indicating apparatus 94.

The cathode ray beam now makes two circuits of the tube screen per cycle of the voltage on line 97 and a 1° shift in the phase of the current through transformer 40 is now indicated by a 2° change in the position of the indicating unit.

The scale modulus may be increased to whatever extent is necessary or desirable in making the required observations. Multiplication of the frequency directed to the deflecting plates by a factor of 90 will provide apparatus in which a 1° shift of the phase of the measured current is reflected in a 90° change in position of the indicating trace.

It will be obvious that many changes and modifications may be made in the invention without departing from the spirit thereof as expressed in the foregoing description and in the appended claim.

I claim:

1. In phase responsive apparatus, an electrode assembly adapted to produce an electron beam, means for energizing said assembly, means for circularly deflecting said beam, visually responsive means in the path of said beam, a plurality of sources of alternating current, means for deriving a cusped wave from each of said sources of current, means for producing a substantially sinusoidal voltage wave shifted in phase from each of said sources of current, a plurality of electric discharge devices having input and output circuits, a load impedance common to said output circuits, means for impressing on each of said input circuits, individually, corresponding cusped waves and phase shifted waves, and means connecting said load impedance to said electrode assembly.

2. In phase responsive apparatus, a source of reference alternating current, means for deriving a harmonic of said reference source current, a rotating indicating element revolving in synchronism with and in predetermined relation to said harmonic, a second source of alternating current, means for deriving pulses from said second source, and means responsive to said pulses for controlling the radius of rotation of said element.

3. In phase responsive apparatus, a source of reference alternating current of predetermined frequency, means for deriving a harmonic of said reference source current, a rotating indicating element revolving in synchronism with and in predetermined relation to said harmonic, a second source of alternating current having said predetermined frequency, means for deriving pulses from said second source, and means responsive to said pulses for controlling the radius of rotation of said element.

4. In phase responsive apparatus, a source of reference alternating current having a predetermined frequency, a rotating indicating element revolving at an integral multiple of said frequency, a second source of alternating current having said predetermined frequency, means for deriving pulses from said second source, and means responsive to said pulses for controlling the radius of rotation of said element.

ALFRED A. STUART, Jr.

REFERENCES CITED

The following references are of record in the file of this patent:

UNITED STATES PATENTS

| Number | Name | Date |
|---|---|---|
| 2,012,480 | Reich | Aug. 27, 1935 |
| 2,121,359 | Luck et al | June 21, 1938 |
| 2,130,912 | Tolson | Sept. 20, 1938 |
| 2,144,476 | Zuschlag | Jan. 17, 1939 |
| 2,178,074 | Jakel et al. | Oct. 31, 1939 |
| 2,208,376 | Luck | July 16, 1940 |
| 2,208,378 | Luck | July 16, 1940 |
| 2,234,830 | Norton | Mar. 11, 1941 |
| 2,374,817 | Hardy | May 1, 1945 |

FOREIGN PATENTS

| Number | Country | Date |
|---|---|---|
| 406,903 | Great Britain | Mar. 8, 1934 |